United States Patent [19]

Mosley et al.

[11] Patent Number: 4,488,707
[45] Date of Patent: Dec. 18, 1984

[54] CHAIN BINDER AND REVERSING LEVER KNUCKLE

[76] Inventors: Earnest D. Mosley, P.O. Box 4922; Oliver L. Williams, 321 John Chick Dr., both of Greenville, Miss. 38701

[21] Appl. No.: 466,013

[22] Filed: Feb. 14, 1983

[51] Int. Cl.³ .................... B25G 1/06; F16C 11/00
[52] U.S. Cl. .................... 254/243; 81/177 A; 403/100; 403/117; 410/37; 410/100
[58] Field of Search ........... 254/243, 244, 245, 246, 254/247, 248, 249, 250, 251, 252, 253, 254, 255, 256, 257, 258, 259, 260, 261, 130; 410/12, 21, 37, 100, 103; 81/177 R, 177 A, 177 E, 177 ST, 177.8; 403/100, 113, 116, 117; 24/270

[56] References Cited

U.S. PATENT DOCUMENTS

| | | | |
|---|---|---|---|
| 2,029,484 | 2/1936 | Howard et al. | 403/100 |
| 2,353,017 | 7/1944 | Denton | 410/99 X |
| 2,449,600 | 9/1948 | Geiger | 410/100 |
| 2,587,874 | 3/1952 | Mockel | 24/68 CT |
| 2,773,529 | 12/1956 | Valenti | 81/177 ST X |
| 2,821,359 | 1/1958 | Bushnell | 24/270 |
| 2,947,514 | 8/1960 | Goss | 410/100 X |
| 3,657,944 | 4/1972 | Able | 81/177 A X |
| 3,942,454 | 5/1976 | Broling | 410/100 |
| 4,297,916 | 11/1981 | Burroughs | 81/177 A X |
| 4,366,607 | 1/1983 | MacCuaig | 254/243 X |

Primary Examiner—John M. Jillions
Assistant Examiner—Joseph J. Hail, III
Attorney, Agent, or Firm—Harvey B. Jacobson

[57] ABSTRACT

An overcenter tensioning apparatus is provided including an elongated crank member having a first tension member pivotally anchored thereto at one end, an elongated lever arm pivotally connected thereto adjacent its other end and a second tension member pivotally connected thereto intermediate the first tension member and the lever arm. The crank member, when the remote ends of the tension members extend outward in opposite directions, is swingable in one direction toward a limit position slightly past a center position between respective release and tensioning positions and abutment structure is operatively associated with the lever arm and crank member for releasably limiting angular displacement of the lever arm in opposite directions.

7 Claims, 7 Drawing Figures

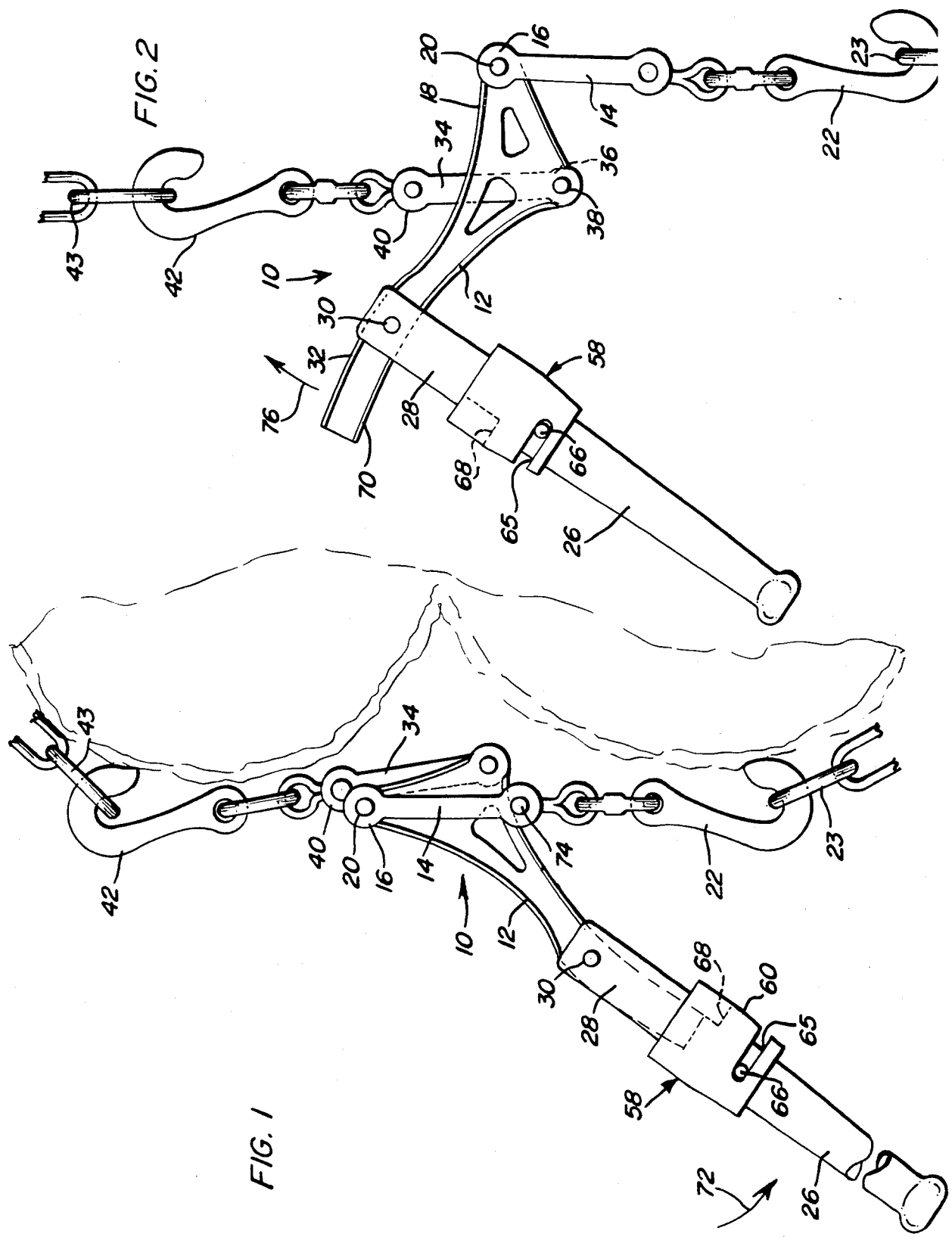

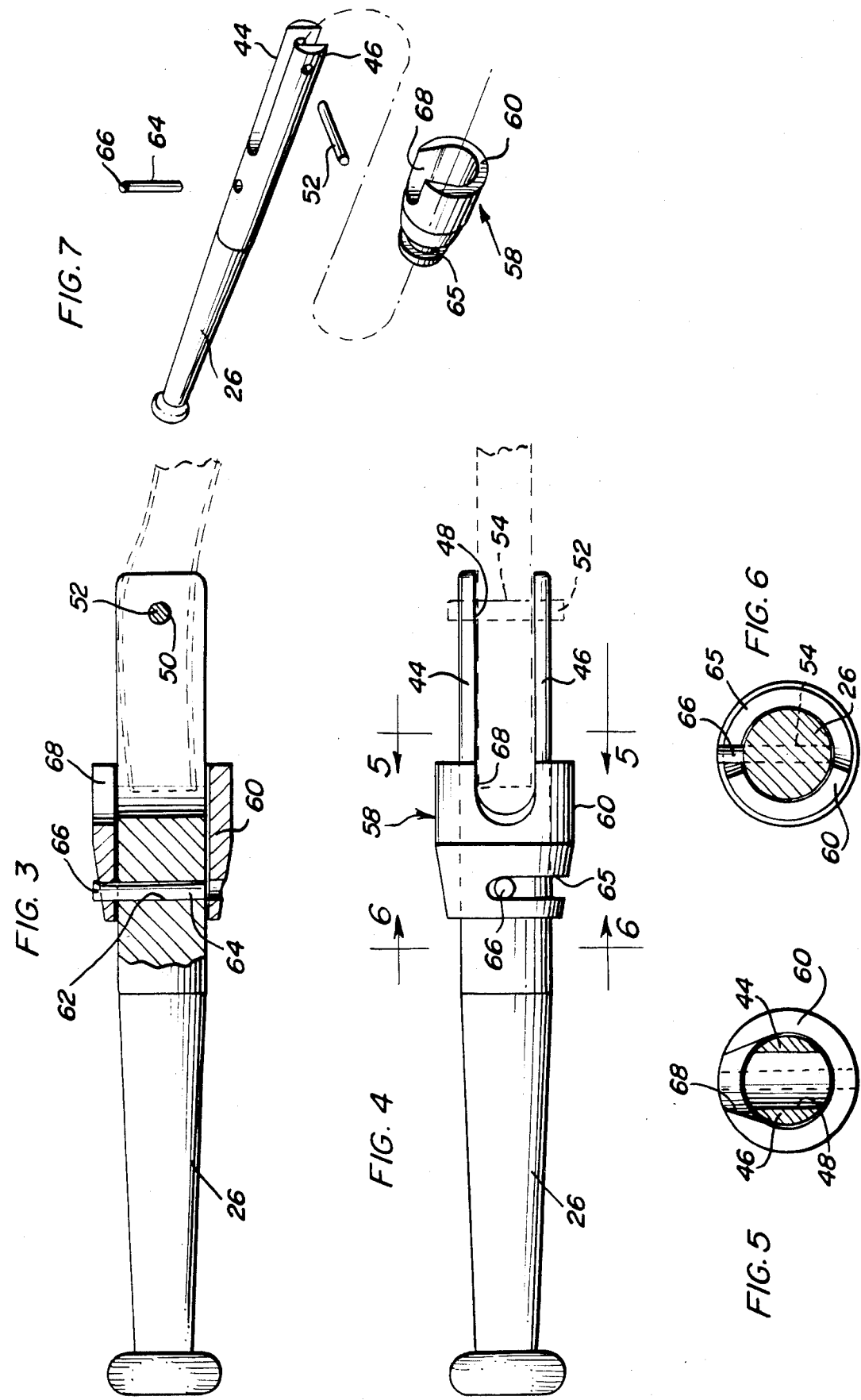

CHAIN BINDER AND REVERSING LEVER KNUCKLE

BACKGROUND OF THE INVENTION

Load tensioning and binding structures of the overcenter lever type heretofore have been provided in many different forms. These tensioning and binding structures include an actuating lever which may be swung slightly past a center position in one direction when in a load tensioning mode and well past the center position in the opposite direction when in the load releasing mode.

When high tensioning forces are desired to bind a load considerable force must be applied to the actuating lever thereof in order to swing the lever to its load tensioning position slightly past the center position and as the lever is swung slightly past the center position the lever has a tendency to "snap" from the center position to its limit position and this snap action can cause injury to the hand of a workman swinging the lever to the overcenter limit position thereof should a portion of his hand be caught between the approach side of the lever and the load being tensioned. In addition, when the lever is swung in the opposite direction through the center position, the lever tends to swing in a snap action toward the load releasing position. This snap action movement can cause injury to various body portions of a workman attempting to release a load tensioning and binding structure. Still further, load tensioning and binding structures of this type are also subject to inadvertent loosening by swinging movement of the levers from the slightly overcenter load tensioning positions to the release positions as a result of foreign objects striking the free end portions of the levers.

Accordingly, a need exists for an overcenter tensioning and binding lever structure which incorporates safety features that will prevent or at least greatly reduce the possibility of personal injury as a result of operation thereof and which will prevent or substantially eliminate any possibility of accidental loosening of the load tensioning and binding structure.

Examples of load tensioning and binding structures including some of the general structural and operational features of the instant invention are disclosed in U.S. Pat. Nos. 2,353,017, 2,449,600, 2,587,874, 2,821,359, 2,947,514 and 3,942,454.

BRIEF DESCRIPTION OF THE INVENTION

The load tensioning and binding structure of the instant invention is equipped with a crank member as is conventional, but the handle end of the crank member has a lever arm pivotally supported therefrom and abutment structure is operatively associated with the lever arm and the crank member for releasably limiting angular displacement of the lever arm in opposite directions of angular displacement relative to the crank member. In this manner, the abutment structure may be actuated to allow swinging movement of the crank member in advance of the lever arm in either direction of swinging movement of the lever arm.

The main object of this invention is to provide an overcenter-type of tensioning apparatus including means by which the actuating lever arm thereof is connected to the associated crank member in a manner such that the crank member may swing in advance of the lever arm in selected directions of swinging movement of the crank member.

Another object of this invention to be specifically enumerated herein is to provide an overcenter-type tensioning apparatus in accordance with the preceding object and constructed in a manner whereby reverse operation of the abutment structure to limit swinging of the lever arm in one direction relative to the crank member may be readily effected.

Yet another important object of this invention is to provide an overcenter-type tensioning apparatus in accordance with the preceding objects and whose reversing abutment structure is substantially foolproof in operation.

A final object of this invention to be specifically enumerated herein is to provide an overcenter-type tensioning structure which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the chain binder of the instant invention with the crank member thereof in its overcenter load binding limit position;

FIG. 2 is an elevational view of the chain binder with the crank member thereof in a load releasing position and advanced in the direction of swinging movement thereof toward the load releasing position in advance of the associated lever arm;

FIG. 3 is an enlarged elevational view of the lever arm of the chain binder with the reversible abutment structures supported therefrom, the abutment structure and adjacent portion of the lever arm being illustrated in section;

FIG. 4 is a top plan view of the assemblage illustrated in FIG. 3;

FIG. 5 is a vertical sectional view taken substantially upon the plane indicated by the section line 5—5 of FIG. 4;

FIG. 6 is a vertical sectional view taken substantially upon the plane indicated by the section line 6—6 of FIG. 4; and FIG. 7 is an exploded perspective view of the lever arm and reversible abutment structure.

DETAILED DESCRIPTION OF THE INVENTION

Referring now more specifically to the drawings the numeral 10 generally designates the chain binder of the instant invention. The chain binder includes an elongated crank member 12 having a first elongated tension member 14 pivotally supported at a first end 16 thereof from one end 18 of the crank member 12 as at 20. The second end of the tension member 14 has a hook anchor 22 supported therefrom releasably engaged with one end of a load binding chain 23.

An elongated lever arm 26 has one end 28 thereof pivotally anchored as at 30 to the other end 32 of the crank member 12 and a second tension member 34 has a first end 36 pivotally anchored as at 38 to the crank member 12 intermediate the first tension member 14 and the lever arm 26. The second end 40 of the tension member 34 has a second hook anchor 42 supported therefrom releasably engaged with a second load binding chain 43. Alternately, the hook assembly 42 may be engaged with the end of the load binding chain 23 remote from the hook assembly 22.

The end 28 of the lever arm 26 is bifurcated and includes a pair of spaced furcations 44 and 46 defining a longitudinally extending slot 48 therebetween opening outwardly through opposite sides of the lever arm 26. The free ends of the furcations 44 and 46 are provided with transverse bores 50 and a pivot pin 52 is passed through the bores 50 and a corresponding transverse bore 54 formed in the end 32 of the crank member 12. Thus, the lever arm 26 is free to pivot relative to the crank member 12. Actually, the lever arm 26 may pivot relative to the crank member 12 through an arc slightly greater than 270°.

However, the lever arm 26 supports a reversible abutment assembly referred to in general by the reference numeral 58 therefrom. The abutment assembly 58 comprises a sleeve 60 longitudinally slidable and rotatable relative to the end 28 of the lever arm 26. The lever arm 26 includes a diametric bore 62 through which a diametric pin 64 extends and the sleeve 60 includes a radial slot 65 formed therein extending about a portion of the circumference of the sleeve 60 and in which one end 66 of the pin 64 is slidingly received. The slot 65 is slightly more than 180° in angular extent whereby the end 66 of the pin 64 may engage the opposite ends of the slot 65 to define limits of oscillation of the sleeve 60 relative to the lever arm 26 substantially 180° apart. The sleeve 60 additionally includes a radial slot 68 opening outwardly of the end of the sleeve 60 which faces the pivot fastener or pin 52. The slot 68 tapers toward its radial outermost end and the opposite sides of the slot 68 are tangent with opposite internal peripheral portions of the sleeve 60. The terminal end 70 of the crank member 12 is swingable through the slot.

In operation, when it is desired to swing the crank member 12 in the direction of the arrow 72 in FIG. 1 of the drawings in order to tension the associated chain or chains, the sleeve 60 is swung to the position thereof illustrated in FIG. 1 with the slot 68 on the advance side of the lever arm 26. In this manner, as the crank member 12 passes the center position it may swing in a snap action manner toward the limit position thereof illustrated in FIG. 1. In the limit position the pivot fastener 74 which connects the hook anchor 22 to the tension member 14 abuts the opposing side of the crank member 12. The pivot fastener 74 may project slightly outward of the side of the tension member 14 which overlies the opposing side of the crank member 12. In addition, it is to be noted that the crank member 12 and the tension members 14 and 34 may be constructed in various different manners to allow the crank member to swing between its load binding and load release positions. Actually, the advance represented by the instant invention comprises the lever arm 26, its pivotal connection to the end 32 of the crank member 12, the slot 48 and the sleeve 60. Thus, many different types of load binders may be retrofitted in accordance with the present invention.

When it is desired to swing the crank member 12 from its load binding limit position past the center position thereof, the sleeve 60 is reversed in position to the position thereof illustrated in FIG. 1 and the lever arm 26 may have force applied thereto in order to effect the desired swinging movement of the crank member 12. After the crank member 12 has past the center position and moved slightly toward the load release position, the crank member 12 is free to pivot in the direction of the arrow 76 in advance of the lever arm 26.

Therefore, a person operating the chain binder 10 will not be injured by the free end of the lever arm 26 during snap action movement of the crank member 12 in either direction from the center position thereof.

In addition, when the tensioning device or chain tensioner 10 is in the load tensioning position thereof illustrated in FIG. 1, if the free end of the lever arm 26 is struck by a foreign object moving in a direction opposite to the direction of the arrow 72, the lever arm 26 may swing in a clockwise direction relative to the crank member 12 independent of similar angular displacement of the crank member 12 and therefore will not be operative to cause the anchor assembly or load binding structure to be loosened.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An overcenter tensioning apparatus including an elongated crank member having first and second ends, a first elongated tension member, first pivot means pivotally anchoring one end of said first tension member to said first end, a second elongated tension member, second pivot means pivotally anchoring one end of said second tension member to said crank member intermediate said first pivot means and the other end of said crank member, said crank member, when the other ends of said tension members extend outward in opposite directions, being swingable in one direction toward a limit position slightly past a center position from a release position to a tensioning position defined by said limit position, a lever arm having one end pivotally anchored to said crank member other end, said one end of said lever arm being bifurcated and defining an endwise outwardly opening slot between the furcations thereof, said crank member other end being pivotally anchored between said furcations for oscillation relative thereto about an axis spaced from the terminal end of said other end of said crank member, said lever arm including abutment means supported therefrom from reverse positioning across opposite ends of said slot to prevent movement of said terminal end from the end of said slot blocked by said abutment means.

2. The tensioning apparatus of claim 1 wherein the other ends of said first and second tension members have hook anchors supported therefrom.

3. The tensioning apparatus of claim 1 wherein said abutment means comprises a sleeve rotatably mounted on said lever arm for angular displacement relative thereto between limit positions disposed substantially 180° apart, said sleeve having a radial slot formed therein registered with opposite ends of the slot defined between the furcations of said lever arm when said sleeve is in its 180° limit positions of angular displacement thereof.

4. The tensioning apparatus of claim 3 wherein said slot in said sleeve tapers in width toward its radial outermost end, the radial outermost end of the last mentioned slot being slightly greater than the width of said terminal end of said other end of said crank member.

5. The tensioning apparatus of claim 3 wherein said sleeve includes a circumferential slot formed therein of an angular extent slightly greater than 180°, said lever arm including a radial abutment slidably received in said slot and engageable with the opposite ends thereof to establish limits of angular displacement of said sleeve relative to said lever arm.

6. The tensioning apparatus of claim 5 wherein said radial slot in said sleeve tapers in width toward its radial outermost end, the radial outermost end of the last mentioned slot being slightly greater than the width of said terminal end of said other end of said crank member.

7. The tensioning apparatus of claim 6 wherein the other ends of said first and second tension members have hook anchors supported therefrom.

* * * * *